Patented June 22, 1937

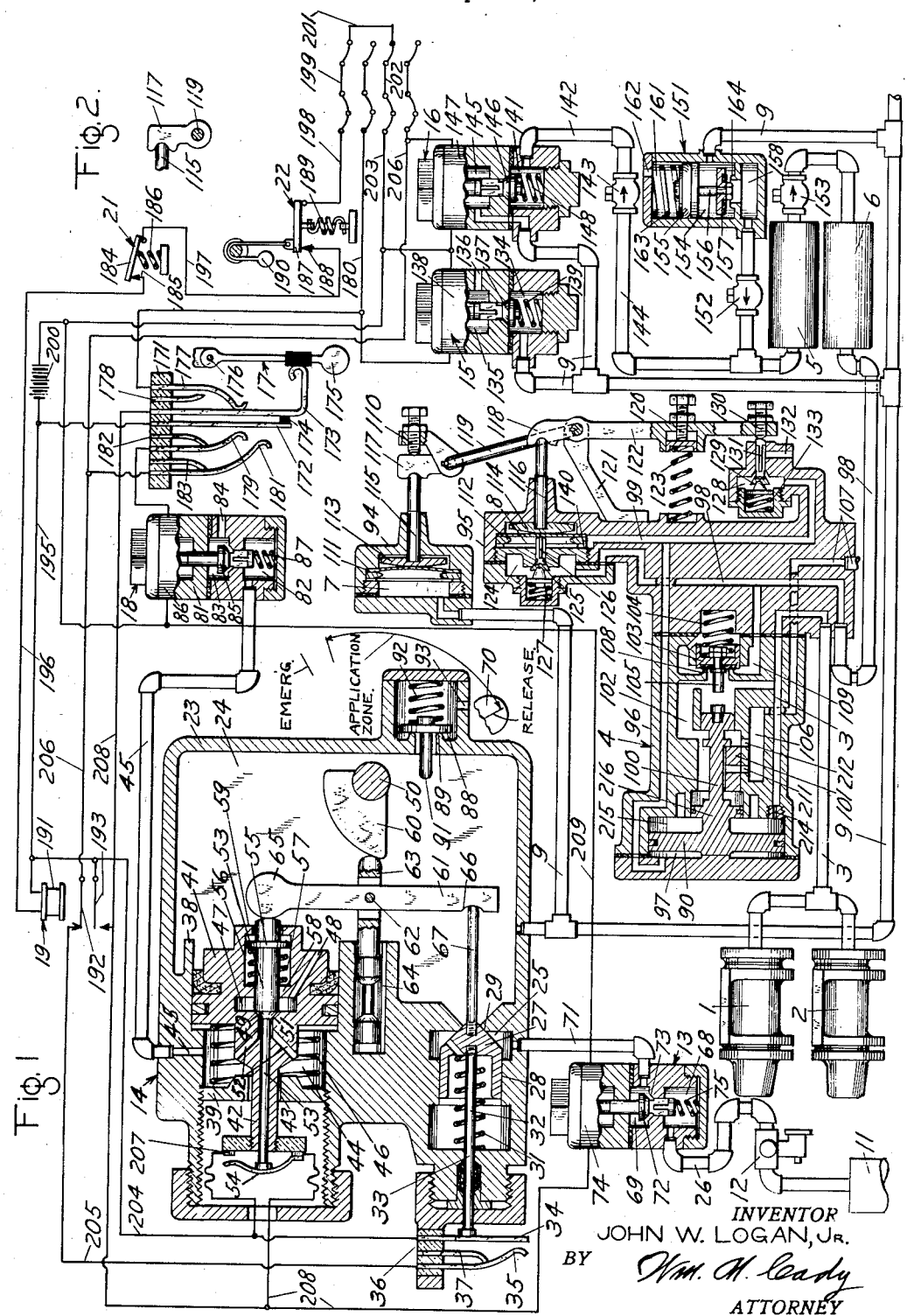

2,084,693

UNITED STATES PATENT OFFICE 2,084,693

TRAIN BRAKE EQUIPMENT

John W. Logan, Jr., Forest Hills, Pa., assignor to The Westinghouse Air Brake Company, Wilmerding, Pa., a corporation of Pennsylvania Application September 18, 1935, Serial No. 41,012

24 Claims. (Cl. 303—15)

This invention relates to a brake equipment for use on multiple unit cars and railway trains, and more particularly to such equipment adapted for use on high speed trains.

In certain types of high speed train braking equipments a straight air controlled portion is provided for effecting service application of the brakes, and an automatic controlled portion is also provided for effecting service applications in case of failure of the straight air controlled portion, and for effecting emergency applications. An automatic application of the brakes will result in case of a broken train, and it may also be effected from any car of the train.

A uniform braking pressure is assured in the several brake cylinders in the case of the straight air controlled application since the several brake cylinders are all supplied with fluid under pressure in accordance with the fluid pressure developed in the common straight air pipe. In the case of an automatic brake application, however, upon a reduction in brake pipe pressure fluid under pressure is supplied to each brake cylinder from the associated auxiliary reservoir and there is a possibility that differences within the several brake cylinders may result, caused by leakage from the brake cylinders, variations in brake cylinder piston travel, and the like, and which will produce different braking forces at different points on the train.

It has been proposed to employ an automatic brake system to initially apply the brakes and to thereafter maintain the brakes applied by a straight air system in which the brake cylinder pressure corresponds at all times to the straight air pipe pressure. Such a combined brake equipment however requires the use of two train line pipes, one pipe being the straight air pipe of the straight air system and the other being the brake pipe (or emergency pipe) of the automatic system.

In accordance with my invention I propose to provide a single pipe brake equipment of the automatic type in which the brake cylinder pressures are regulated under self maintaining and equalization control as now customary only with straight air equipment. I propose to provide means for varying the brake cylinder pressure inversely as the pressure in the brake pipe varies. My proposed system differs from the conventional automatic brake system in that brake cylinder pressure continues to increase upon a continuing lowering of the brake pipe pressure, even below the pressure at which brake pipe pressure normally equalizes with the customary auxiliary reservoir in the conventional automatic system, the brake cylinder pressure reaching its maximum value as the brake pipe pressure approaches zero.

It is an object of my invention to provide a fluid pressure brake equipment that is quick acting both when applying and when releasing the brakes.

It is another object of my invention to provide means for effecting an automatic application of the brakes and for maintaining equalization of brake cylinder pressure in the several brake cylinders of the braking unit.

It is a further object of my invention to provide means for regulating the brake cylinder pressure inversely with variations in the brake pipe pressure below a chosen value regardless of the degree of reduction in brake pipe pressure.

It is a further object of my invention to provide means of the above indicated character in which the brake cylinder pressure continues to increase while the brake pipe pressure continues to decrease to substantially zero pressure.

It is a further object of my invention to provide, in a system of the above indicated character, a retardation controlled equipment for controlling the brake system to limit the rate of retardation of the vehicle in accordance with a desired value.

Other objects and advantages of my invention will be apparent from the following description of one embodiment thereof taken in connection with the accompanying drawing, in which Fig. 1 is a diagrammatic view illustrating apparatus comprising one preferred embodiment of my invention, and Fig. 2 is a detail of a portion of the means for operating a relay valve device.

Referring to Fig. 1 of the drawing a braking equipment may comprise a plurality of braking units, one only being illustrated. Each local braking unit of the train may comprise brake cylinders 1 and 2 that are supplied with fluid under pressure through the brake cylinder pipe 3 in accordance with the operation of a relay valve device 4 that controls the supply of fluid under pressure from the local reservoirs 5 and 6 of the unit to the brake cylinders in accordance with variations in the sum of the pressures within the diaphragm chambers 7 and 8 from a predetermined value. The pressure within the diaphragm chamber 7 corresponds to that within the brake pipe 9, that extends the length of the train and is connected to all braking units of the train and the ultimate pressure in the chamber 8 corresponds to brake cylinder pressure, the sum of these two pressures balancing the force of a spring 123 when the controlled valves are in lap position. Fluid under pressure flows to the brake pipe 9 from the main reservoir 11 as supplied by a feed valve device 12 through a supply magnet valve device 13 and a brake valve device 14. The pressure within the diaphragm chamber 8 is controlled in part by the brake pipe pressure in response to the operation of the brake valve device 14, and in part by the operation of a discharge magnet valve device 15 and a supply magnet valve device 16 that are controlled in accordance with the operation of a retardation controller 17. The supply magnet valve device 13 and the discharge cut-off magnet valve device 18 are controlled either in accordance with the operation of the brake valve device 14 or in accordance with the operation of the emergency relay 19, that is controlled in accordance with the operation of the deadman switch 21 or the conductor's switch 22. The emergency relay 19, in addition to controlling the supply magnet valve device 13 and the discharge cut-off magnet valve device 18, also controls the discharge magnet valve device 15 and the supply magnet valve device 16, associated with each local braking unit of the train to effect an emergency operation of the brakes independently of the operation of the brake valve device 14.

The brake valve device 14 comprises a casing 23 defining a pressure chamber 24 that is in constant open communication with the brake pipe 9. A supply valve chamber 25 is also provided in the casing to which fluid under pressure is supplied from the main reservoir 11 at a reduced pressure, as supplied by the feed valve device 12 of the usual type, through the pipe 26 as controlled by the supply magnet valve device 13. A supply valve 27 is contained within the supply valve chamber 25 and is slidably disposed within a bore 28 in the casing to engage a seat 29 carried by a portion of the casing forming one wall of the chamber 24. The supply valve 27 is subject to the pressure of a spring 31, one end of which engages the valve and the other end of which engages the outer wall of the casing. A stem or rod 32 is provided, one end of which is attached to the supply valve 27 and the other end of which extends through an opening 33 in the outer wall of the casing adjacent a contact member 34 that is adapted to engage a switch contact member 35, the contact members 34 and 35 comprising a switch for closing a circuit upon the movement of the supply valve 27 toward the left. The contact members 34 and 35 are mounted in a base of insulating material 36 and a stop 37 is provided for preventing the contact member 35 from moving toward the right beyond a predetermined point, to insure the separation of the contact members 34 and 35 upon movement of the stem 32 toward the right.

The casing 23 is also provided with a cylinder 38 which is open at one end to the pressure chamber 24, the other end of the cylinder being closed by an adjusting member 39 screw-threadedly attached within a bore in the casing section. Operatively mounted in the cylinder 38, adjacent its open end, is a movable abutment in the form of a piston 41 having a stem 42 which is slidably guided by the adjustable member 39 within the bore 43. At one end of the piston 41 is a chamber 44 which is normally open to the atmosphere through the passage and pipe 45 and the discharge cut-off magnet valve device 18. A regulating spring 46 is contained in the chamber 44 and is interposed between and engages the inner face of the piston 41 and the inner face of the adjusting member 39.

A discharge valve chamber 47 is provided within the piston 41 and is in open communication with the pressure chamber 24 through a passage 48. A discharge valve 49 is contained within the valve chamber 47 and is adapted to seat on a valve seat 51 formed on the piston and which is operated to control communication between the valve chamber 47 and the chamber 44 through connecting passages 52 in the connecting stem 42. The discharge valve is provided with a stem 53, the small end of which slides within a bore in the stem 42 of the piston 41 and is operable to hold a spring pressed switch blade 54 out of circuit closing position when the discharge valve 49 is in engagement with its valve seat 51. The larger end of the discharge valve stem 53 is provided with a collar 55 which slidably engages the piston within a central bore 56 and is subject to the pressure of a discharge valve spring 57 interposed between the collar 55 and the annular flange 58 on the piston 41. Outward movement of the discharge valve relative to the piston 41 is limited by the collar 55 which engages a stop plate 59 that is secured to the piston 41.

Mechanism is provided for controlling the operation of the supply valve 27 and the discharge valve 49, comprising a lever 61 that is pivotally mounted on a pin 62 carried by a plunger 63 that is slidably guided within the bore 64 within the wall of the casing.

The upper end of the lever 61 is provided with a rounded portion 65 that is adapted to operatively engage the outer end of the discharge valve stem 53. The lower end of the lever 61 is provided with a recess 66 into which one end of a rod 67 is fitted, the opposite end of the rod operatively engaging the supply valve 27 within a recess formed in its face.

For the purpose of operating the plunger 63 toward the left there is provided an operating shaft 50 provided with a cam 60 and operated by a lever 70.

It will be appreciated that the force of the discharge valve spring 57 is less than that of the supply valve spring 31, which is less than that of the regulating spring 46, so that upon movement of the plunger 63 toward the left the discharge valve 49 will engage the valve seat 51 before the supply valve 27 is moved away from its valve seat 29. When the system is charged and the shaft 50, the cam 60, and lever 70 are in their release positions, as shown in Fig. 1 of the drawing, the discharge valve 49 is forced to its seat 51 thus closing communication from the pressure chamber 24 to the atmosphere, and the supply valve 27 is forced to its seat 29 by the supply valve spring 31.

The brake valve device 14 is also provided with an emergency valve 88 that is adapted to engage the rib seat 89 and is provided with a stem 91 extending into the pressure chamber 24. The valve 88 is normally urged to its seat by a spring 92, and is forced from its seat against the force of the spring 92 upon engagement of the cam 60 with the stem 91 as the lever 70 is moved to emergency position, in which position fluid under pressure is released from the pressure chamber 24 past the emergency valve 88 through the exhaust port 93.

The supply magnet valve device 13 comprises a casing enclosing a chamber 68 that is in open communication with the pipe 26, and with a valve chamber 69 that is in open communication through a pipe 71 with the supply valve chamber 25. A valve 72 is provided within the valve chamber 69 that is adapted to engage the seat 73 to control communication between the valve chamber 69 and the chamber 68 upon energization of the magnet 74 of the magnet valve device. A spring 75 is provided within the chamber 68 for urging the valve 72 from its seat.

An exhaust cut-off valve device 18 comprises a casing 81 enclosing a chamber 82, that is in constant communication with the chamber 44 of the brake valve device through pipe 45, and a valve chamber 83, that is in constant communication with the atmosphere through the exhaust port 84 and which contains a valve 85 that is connected by means of a stem with the operating magnet 86. A spring 87 is provided within the chamber 82 for forcing the valve 85 from its seat.

The relay valve device 4 comprises diaphragm operated devices 94 and 95 containing respectively the diaphragm chambers 7 and 8, and a casing 96 containing a piston chamber 97. The relay valve device is operative to control the supply of fluid under pressure from the local reservoirs 5 and 6 of a braking unit to the brake cylinders 1 and 2 of that unit in accordance with the pressure within the piston chamber 97 as supplied through the supply pipe and passage 98, the diaphragm operated valve device 95 and passage 99 to the piston chamber 97. The piston chamber 97 contains a piston 90 that is adapted through the medium of a stem 100 to operate a slide valve 101 that is operatively connected to the stem and contained in a slide valve chamber 102 that is constantly connected to the brake cylinders 1 and 2 through brake passage and pipe 3. Also contained in the casing is a fluid pressure supply valve 103 which is subject to the pressure of the spring 104 and which is provided with a stem 105 that is adapted to operatively engage the end of the piston stem 100.

The relay valve device 4 is shown with the relay piston 90 and the slide valve 101 in their extreme left or brake releasing positions. With the slide valve 101 in this position, the valve chamber 102 and consequently the brake cylinders 1 and 2 are connected to the atmosphere through an exhaust chamber 106 and an exhaust passage and pipe 107. With the piston 90 in release position the stem 100 will be out of engagement with the end of the supply valve stem 105 so that the pressure of the spring 104 will maintain the supply valve 103 seated against its seat rib 108, thereby maintaining communication closed from a supply valve chamber 109 that is constantly connected to the local reservoirs 5 and 6 through passage and pipe 98, to the slide valve chamber 102.

The diaphragm operated devices 94 and 95 contain, respectively, diaphragm chambers 7 and 8 containing equal area diaphragms 111 and 112 which engage followers 113 and 114 connected, respectively, to the stems 115 and 116 that are positioned to operate at a common radius from the shaft 119 through upwardly extending levers 117 and 118 to rotate the shaft 119 in a clockwise direction. In order to provide means for accurately adjusting the relative positions of the levers 117 and 118, one of them, as 117, may be loosely mounted on the shaft 119 and positioned with respect thereto by a set screw 110. The shaft 119 is mounted upon a bracket 121 connected to the casing 96 and the lever 118 is provided with a downwardly extending arm 122 that operatively engages one end of a spring 123, the other end of which is positioned in a recess in the casing 96, for biasing the shaft 119 in a counterclockwise direction against the pressure in the diaphragm chambers 7 and 8.

The spring 123 is so designed and adjusted by the set screw 120 as to just balance a predetermined pressure, say 60 pounds, in either one of the diaphragm chambers 7 and 8 when the other diaphragm chamber is at atmospheric pressure. It will be understood therefore that the force of the spring 123 will balance the force of the diaphragm stems 115 and 116 when the sum of the pressures in the two diaphragm chambers 7 and 8 is equal to the predetermined pressure, such as 60 pounds. If, for example, the pressure in the diaphragm chamber 7 is 40 pounds, then the pressure within the diaphragm chamber 8 required to balance the force of the spring 123 will be 20 pounds. The diaphragm chamber 7 is connected directly to the brake pipe 9 so that the pressure within the chamber 7 is always brake pipe pressure.

A chamber 124, that is in constant communication with the local reservoirs 5 and 6 through the passage and pipe 98, is contained within the casing comprising the diaphragm operated device 95. The inlet valve 125 is provided for controlling communication between the chamber 124 and the diaphragm chamber 8 and is provided with a valve stem 126 extending through a bore in the partition wall between the two chambers and engages the diaphragm 112. A spring 127 is provided for urging the inlet valve 125 to its seat and when the pressure within the diaphragm chambers 7 and 8 is insufficient to overcome the force of the spring 123, the spring 123 causes the shaft 119 to rotate in a counterclockwise direction, the inlet valve 125 being thus forced from its seat against the bias of the spring 127 by the diaphragm 112 and the follower 114.

The diaphragm chamber 8 is in communication with an exhaust valve chamber 128 through a restricted passage 140 and the passage 99. The exhaust valve chamber 128 contains an exhaust valve 129 having a stem 131 that is adapted to be engaged by a set screw 130 carried by the lower portion of the downwardly extending lever 122 and is normally biased to its seat by a spring 133 within the valve chamber 128. The exhaust valve 129 controls communication from the diaphragm chamber 8 and from the exhaust valve chamber 128 to the atmosphere through the exhaust passage 132 in accordance with the movement of the shaft 119 and the downwardly extended lever 122.

Each local discharge magnet valve device 15 comprises a casing containing a discharge valve chamber 134 that is in constant communication with the brake pipe 9 and an exhaust chamber 135 that is in constant communication with the atmosphere through an exhaust port 136. The valve chamber 134 contains a discharge valve 137 that is connected by means of a stem to the operating magnet 138, and a spring 139 is provided within the valve chamber 134 for urging the valve 137 towards its seat.

Each local supply magnet valve device 16 is provided with a casing containing a supply valve chamber 141 that is connected by means of a pipe 142, check valve 143 and pipe 144 to the local reservoir 5, and with a chamber 145 that is in constant communication with the brake pipe 9. A supply valve 146 is provided for controlling communication between the valve chamber 141 and the chamber 145, and is provided with an upwardly extending stem that is operatively connected to the magnet 147. A spring 148 is provided within the valve chamber 141 for urging the valve 146 toward its seat. The check valve 143 prevents the flow of fluid under pressure from the brake pipe 9 to charge the reservoirs 5 and 6 through the magnet valve device 16.

Fluid under pressure is supplied to the local reservoirs 5 and 6 from the main reservoir 11 through the brake pipe 9, a cut-off valve device 151, and a one-way check valve 152. A one-way check valve 153 is provided between the local reservoirs 5 and 6 to prevent back-flow of fluid under pressure from the reservoir 6 into the reservoir 5 upon a reduction in pressure in the reservoir 5, thus maintaining the fluid in the reservoir 6 for supplying the brake cylinders.

The cut-off valve device 151 comprises a casing enclosing a piston chamber 154 containing a piston 155 that is operatively connected by a stem 156 to a valve 157 for controlling communication between the piston chamber 154, that is in constant communication with the brake pipe 9, and the chamber 158. The space 161 above the piston 155 is connected to the atmosphere through a port 162 and is provided with a spring 163 for urging the valve 157 to its seat. The spring 163 is so adjusted that the valve 157 is moved from its seat only when the pressure within the piston chamber 154 is as great as, or greater than, the combined pressures in the diaphragms 7 and 8 required to balance the pressure of the spring 123, say, for example, 60 pounds per square inch. When the pressure within the brake pipe 9 exceeds this predetermined value the piston 155 is forced upwardly against the pressure of the spring 163, thus lifting the valve 157 from its rib seat 164 and permitting the flow of fluid under pressure from the brake pipe 9 through chambers 154 and 158, past the one-way check valve 152 into the local reservoir 5, and past the one-way check valve 153 into the local reservoir 6. The flow of fluid under pressure from the local reservoirs 5 and 6 to the brake pipe 9, upon the lowering of the brake pipe pressure, is prevented by the check valves 153, 154 and the cut-off valve 157.

The retardation controller 17 comprises an insulating base 171 in which are mounted spring contacts 172 and 173 that are separated by insulating material 174 and are adapted to be moved upon movement of an inertia device, such as the pendulum 175 that is pivotally supported on the pin 176 and is mounted to freely move toward the left in accordance with the rate of retardation of the vehicle. A spring contact finger 177 is normally in engagement with the contact member 173 and is provided with a stop 178 for limiting its motion toward the left upon movement of the contact member 173 in that direction. The contact member 172 is adapted to engage the contact fingers 179 upon a predetermined movement toward the left, and, upon a further predetermined movement, to engage the contact finger 181. Stop members 182 and 183 are respectively provided for the contact fingers 179 and 181 to limit their movement toward the right as the contact member 172 moves in that direction out of engagement with the fingers 179 and 181.

The deadman switch 21 comprises a movable contact member 184 that is adapted to engage the contact member 185 and is urged out of engagement therefrom by a spring 186. The deadman switch 21 is maintained in circuit closing position so long as manual pressure is exerted upon the movable contact member 184 to force it into engagement with the contact member 185 against the force of the spring 186.

The conductor's switch 22 comprises a movable contact member 187 that is adapted to engage a fixed contact member 188 and is normally maintained in engagement therewith by a spring 189 and is adapted to be moved from engagement therewith by a manually operable means such as the handle 190.

The emergency relay 19 comprises an operating winding 191 and two movable contact members 192 and 193 that are illustrated in their upper positions, which are the positions effected upon the energization of the winding 191, which is energized through a circuit extending from the positive terminal of the battery 200, through conductor 195, the winding 191 of the relay 19, conductor 196, the deadman switch 21, conductor 197, conductor's switch 22, conductor 198, a conductor 199 representing the train conductor for each of the several cars of the train, through a jumper 201 at the rear of the train, and by return conductors 202 and 203 to the negative terminal of the battery 200.

The operation of the system will now be described. When the train is in operation, the system is charged, and the brake valve handle 70 is in its illustrated position, the brakes will be released and the several parts of the equipment will be in their illustrated positions. The windings of the several magnet valve devices 13, 15, 16 and 18 will be deenergized.

If the handle 70 is positioned in its release position prior to charging of the equipment, the pressure within the pressure chamber 24 will be insufficient to overcome the force of the regulating spring 46 acting on one side of the movable abutment or piston 41, and this piston will be forced toward the right by the regulating spring 46 with sufficient force that the discharge valve stem 53 which engages the rounded end 65 of the lever 61 will pivot this lever about the pin 62 causing the rod 67 to force the supply valve 27 toward the left from its seat 29 against the bias of the supply valve spring 31, and effecting communication between the main reservoir 11 and the pressure chamber 24. Fluid under pressure to charge the system will thus flow from the main reservoir 11, at a reduced pressure as supplied by the feed valve device 12, through pipe 26, the supply magnet valve device 13, pipe 71, the supply valve chamber 25 to the pressure chamber 24 and to the brake pipe 9.

Upon the flow of fluid under pressure from the main reservoir 11 to the supply chamber 24 and to the brake pipe 9, pressure is exerted on the chamber side of the piston 41 in opposition to the pressure exerted by the regulating spring 46. This pressure continues to build up until it becomes sufficient to force the piston 41 toward the left, relieving the pressure on the rounded end 65 of the lever 61 and permitting the supply valve spring 31 to force the supply valve 27 to its seat 29, and rod 67 toward the right, pivoting the lever 61 about the pivot pin 62. The amount of pressure on the chamber side of the piston 41 necessary to effect a sufficient movement of the piston 41 to cause the supply valve 27 to seat is dependent upon the stiffness of the regulating spring 46, which is adjusted by movement of the adjustable member 39 to such value as to effect the full desired brake pipe pressure. Since the force of the regulating spring 46 is exerted on the lever 61 through the discharge valve stem 53, and since the force exerted by the discharge valve spring 57 is less than the force exerted by the supply valve spring 31, the valve 49 is held against its seat 51.

At the time the supply valve 27 is unseated to effect charging of the brake pipe 9 the magnet of the magnet valve device 16 will be energized through a circuit extending from the positive terminal of the battery 200 through conductor 195, conductor 204, the contact members 34 and 35 that are controlled by the supply valve 27, conductor 205, the contact member 192 of the emergency relay 19, conductor 206 and the winding of the magnet 147 of the magnet valve device 16, and conductor 203 to the negative terminal of the battery 200.

When the supply valve 27 is moved to its seat and the stem 33 is moved toward the right, away from the switch spring contact 34 this contact moves out of engagement with the switch contact member 35 to interrupt the above traced circuit through the winding of the magnet 147 of the local supply magnet valve device 16, thus deenergizing this magnet and permitting the valve 146 to be forced to its seat by the spring 148 to prevent the flow of fluid under pressure from the local reservoir 5 through the supply magnet valve device 16 to the brake pipe 9 upon the reduction in brake pipe pressure. This operation of the valve 146 has no significance during the initial charging of the system since the supply reservoir 5 has not been charged and the check valve 143 prevents it from being charged from the brake pipe 9 through the magnet valve device 16.

When the pressure in the brake pipe 9 has increased sufficiently to effect the full release of the brakes, and has reached the predetermined value at which the pressure on the under side of the piston 155 overbalances the force of the spring 163, the valve 156 is unseated to effect the charging of the reservoirs 5 and 6 from the brake pipe 9 through the cut-off valve device 151. The check valve 152 prevents the brake pipe 9 from being recharged by the flow of fluid under pressure from the reservoir 5 through the cut-off valve device 151 upon a reduction in brake pipe pressure, thus maintaining the pressure within the reservoir 5 until the magnet valve device 16 is operated to effect the recharge of the brake pipe through the magnet valve device 16. The check valve device 153 prevents the flow of fluid under pressure from the local auxiliary reservoir 6 to the supply reservoir 5 upon a reduction in pressure in the reservoir 5 thus preventing the loss of pressure from the reservoir 6 upon the recharge of the brake pipe 9 from the reservoir 5 to maintain the supply of fluid under pressure in the reservoir 6 available at all times for supply to the brake cylinders 1 and 2.

From the brake pipe 9 fluid under pressure flows to charge the diaphragm chamber 7 of the diaphragm operated device 94 and also to charge the valve chamber 134 of the discharge magnet valve device 15 and the chamber 145 of the supply magnet valve device 16. Fluid under pressure at brake pipe pressure also flows to the piston chamber 154 of the cut-off valve device 151, and when the pressure within the brake pipe has risen to the predetermined amount, say 60 pounds per square inch, at which the force against the piston 155 becomes greater than the force of the spring 163, the piston 155 and the valve 157 are moved upwardly to open communication from the brake pipe 9 through chamber 154, check valve device 152 to the local reservoir 5 and through check valve device 153 to the local reservoir 6. Fluid under pressure also flows from the pipe 144 past check valve device 143 to the valve chamber 141 of the local supply magnet valve device 16. Since the cutoff valve device 151 is so adjusted that charging of the local reservoirs 5 and 6 from the brake pipe 9 is permitted only when the pressure within the brake pipe has reached the predetermined amount, say 60 pounds, at which the brake pipe pressure within the diaphragm chamber 7 of the diaphragm operated device 94 is sufficient to rotate the shaft 119 in a clockwise direction against the force of the spring 123, the charging of the local reservoirs 5 and 6 takes place only when the exhaust valve 129 is unseated and when the pressure in the piston chamber 97 of the relay valve device 4 and in the brake cylinders 1 and 2 is at atmospheric pressure.

If the operator now wishes to make a service application of the brakes the lever 70 of the brake valve device 14 is moved from its release position, thus moving the shaft 59 and cam 60 of the brake valve device 14 in a counterclockwise direction an amount dependent upon the desired degree of application of the brakes. Upon such movement of the cam 60, the pressure against the plunger 63 is released and the discharge valve 53 is forced by the discharge valve spring 67 from its seat 51, thus permitting the escape of fluid under pressure from the pressure chamber 24 of the brake valve device 14 and from the brake pipe 9, through passage 48, discharge valve chamber 47, passages 52, chamber 44, and through passage and pipe 45 to the chamber 82 of the discharge cut-off magnet valve device 18, past the unseated valve 85 to the atmosphere through the exhaust port 84, thus decreasing the pressure in the brake pipe 9 and in the diaphragm chamber 7 of the diaphragm operated device 94 constituting a part of the relay valve device 4.

As the discharge valve 49 is moved from its seat the stem 53 is moved toward the right away from the spring contact member 54 which moves into engagement with the contact member 207 to close circuits for energizing the winding of the supply magnet valve device 13 and the windings of the several local discharge magnet valve devices 15 that extend from the positive terminal of the battery 200 through conductor 195, conductor 204, the switch contact members 207 to 54, to the conductor 208, at which point the circuits divide, one circuit extending through the winding of the magnet 74 of the supply magnet valve device 13 and conductor 209 to the negative terminal of the battery 200. The winding of the magnet 74 thus energized causes the valve 72 to be moved downwardly against its seat 73 and close communication from the main reservoir 11 to the pressure chamber 24, while fluid under pressure is being released to the atmosphere from the pressure chamber 24. The other branch of the divided circuit is completed from the conductor 208 to the contact members 173 and 177 of the retardation controller to the train line conductor 180, through the windings of the magnets 138 of the discharge magnet valve devices 15 to the train line conductor 203 and to the negative terminal of the battery 200. The winding of the magnet 138, thus energized, forces the valve 137 from its seat and effects the release of fluid under pressure from the brake pipe 9 through the exhaust port 136 to also effect a reduction in brake pipe pressure.

The amount of decrease in fluid pressure in the pressure chamber 24 and in the brake pipe 9 upon movement of the lever 70 from its release position is dependent upon the amount of movement of the cam 60, and, consequently, the amount of movement of the piston 41 necessary to again cause the discharge valve 49 to engage its seat 51 upon movement of the piston 41 toward the right. As the pressure in the pressure chamber 24 decreases the adjusting spring 46 forces the piston 41 toward the right until the stem of the discharge valve 49 has again engaged the rounded portion 65 of the lever 61 thus forcing the valve 49 to its seat 51 to close communication from the pressure chamber 24 to the atmosphere through the passages above described.

When the pressure in the brake pipe 9, and in the pressure chamber 7, decreases below the value necessary to balance the force of the spring 123, the lever 122 and the shaft 119 are forced by the spring 123 in a counterclockwise direction, thus permitting the exhaust valve 129 to be forced to its seat by the spring 133 and close communication from the diaphragm chamber 8 and from the piston chamber 97 to the atmosphere through the exhaust port 132. At the same time the inlet valve 125 is forced against the pressure of the spring 127 through operation of the lever 118, the stem 116, the follower 114 and the diaphragm 112, thus permitting the flow of fluid under pressure from the local reservoirs 5 and 6 through pipe and passage 98 to the inlet valve chamber 124, past the unseated inlet valve 125 to the diaphragm chamber 8 and to the piston chamber 97 of the relay valve device 4. The flow of fluid under pressure to the chamber 8 and to the piston chamber 97 will continue until the pressure within the diaphragm chamber 8 has reached such a value that the combined pressures within the diaphragm chambers 7 and 8 are sufficient to force the shaft 119 in a clockwise direction against the force of the spring 123 to permit the inlet valve 125 to seat. The pressure within the diaphragm chamber 8 and the piston chamber 97 is therefore determined by the amount of the release of the brake pipe pressure below the value required in the diaphragm chamber 7 to balance the force of the spring 123. For example, if the balancing pressure is 60 pounds and the pressure in the brake pipe 9 is reduced to 40 pounds the pressure required in the chamber 8 will be 20 pounds.

Upon the flow of fluid under pressure to the piston chamber 97, the piston 90 and the stem 100 move toward the right, thus moving the slide valve 101 to lap the passages 211 and 212 through which the slide valve chamber 102 is connected to the atmosphere, and, as the piston 90 continues to move toward the right the end of the stem 100 engages the end of the supply valve stem 105 to force the supply valve 103 from its seat against the pressure of the spring 104 and permit the flow of fluid under pressure from the local reservoir 6 through the supply pipe and passage 98, the supply valve chamber 109, past the unseated supply valve 103 to the slide valve chamber 102 and through brake pipe passage and pipe 3 to the brake cylinders 1 and 2. As the pressure in the slide valve chamber 102 rises, fluid under pressure flows through the restricted port 214 into a chamber 215 on the rear of the piston 90 that is sealed from the supply valve chamber 102 by a phantom piston 216. When the pressure in the chamber 215 becomes equal to the pressure in the piston chamber 97, the force of the supply valve spring 104 exerted through the supply valve stem 105 that is in engagement with the piston stem 100 will force the piston and its stem and the slide valve 101 sufficiently toward the left to permit the seating of the supply valve 103, while maintaining the slide valve 101 in lap position, thus maintaining a pressure within the brake cylinders 1 and 2 corresponding to the pressure within the piston chamber 97.

If the operator desires a greater degree of application of the brakes the handle 70 is moved further from its release position thus effecting a greater decrease in the pressure within the pressure chamber 24 of the brake valve device 14 and within the brake pipe 9 which effects a corresponding increase in the pressure within the diaphragm chamber 8 and the piston chamber 97 of the relay device 4 and a corresponding increase in the pressure within the brake cylinders 1 and 2 in the manner already described.

If the operator wishes to release the brakes the handle 70 is moved to its release position thus effecting the supply of fluid under pressure from the main reservoir 11 past the unseated supply valve 27 to the pressure chamber 24 and to the brake pipe 9 in the manner above described for charging the system.

The magnet valve devices 16 are energized through the switch contact members 34 and 35 controlled by the supply valve 27 to unseat the valves 146 to also effect the supply of fluid under pressure to the brake pipe 9 from the reservoir 5. Should the flow of fluid under pressure from the reservoir 5 to the brake pipe 9 through the magnet valve device 16 continue sufficiently that the reduction in reservoir pressure and the increase in brake pipe pressure causes these two pressures to equalize, the flow of fluid under pressure from the brake pipe through the magnet valve device 16 to the reservoir 5, upon a further increase in brake pipe pressure is prevented by the check valve 143, thus aiding in effecting a more rapid build-up in brake pipe pressure. When the build-up in brake pipe pressure has continued sufficiently to effect the full release of the brakes, or has reached the predetermined value at which the pressure on the under side of the piston 155 of the cut-off valve device 151 over-balances the force of the spring 163 the valve 156 is lifted from its seat to effect the recharging of the reservoir 5 from the brake pipe 9 through the cut-off valve device 151.

As the pressure in the brake pipe increases during the release of the brakes, the pressure in the diaphragm chamber 7 causes the shaft 119 and the lever 122 to be moved in a clockwise direction against the pressure of the spring 123 thus seating the inlet valve 125 and unseating the exhaust valve 129 to permit the release of fluid under pressure from the diaphragm chamber 8 and from the piston chamber 97 to the atmosphere through the passage 99 and the exhaust port 132.

Should the operator wish to make an emergency application of the brakes the handle 70 is moved to emergency position in which position the flat side of the cam 60 engages the emergency valve stem 91 forcing the emergency valve 89 from its seat against the force of the spring 92, thus permitting fluid under pressure to be released from the brake pipe 9 and the pressure chamber 24 through the exhaust port 93 to effect a rapid decrease in brake pipe pressure. This decrease in pressure is independent of the discharge cut-off valve device 18.

It will be noted that when the handle 70 of the brake valve device was moved from release position to an application position, the brake valve discharge cut-off valve device 18, which had been deenergized and in a position to effect communication from the chamber 44 of the brake valve device to the atmosphere remained in that position. The supply magnet valve device 13 became energized upon closure of the circuit through the switch contact members 54 and 207, thus causing the valve 72 to close communication from the main reservoir 11 to the pressure chamber 24 of the brake valve device and to the brake pipe 9. The winding of the local discharge magnet valve devices 15 also became energized upon engagement of the switch contact members 54 and 207, to effect the release of fluid under pressure therethrough and effect a more rapid rate of reduction in brake pipe pressure. The local supply magnet valve devices 16 of the several local braking units which became deenergized upon separation of the switch contact members 34 and 35 upon completion of the charging of the system, remain deenergized thus maintaining the valves 146 in position to close communication from the local reservoirs 5 through the valve devices 16 to the brake pipe 9.

Should the rate of retardation of the vehicle become sufficient to cause the inertia pendulum 175 to move forward, or toward the left as viewed in the drawing, sufficiently to cause the switch contact member 173 to separate from the contact member 177 the circuit through the winding of the magnet of the local discharge magnet valve device 15 will be interrupted, thus causing the valve 137 to be seated by the spring 139 and prevent further decrease in brake pipe pressure occasioned by the release of fluid under pressure through the magnet valve devices 15. At the same time the switch contact members 172 and 179 are brought into engagement, thus completing a circuit through the winding of the magnet 86 of the cut-off magnet valve device 18 causing the valve 85 to be seated and prevent the further flow of fluid under pressure from the pressure chamber 24 to the atmosphere through the exhaust port 84. If the rate of retardation of the vehicle becomes sufficient so that the pendulum 175 moves forward sufficiently to cause engagement of the contact member 172 with the contact member 181 a circuit is also completed for energizing the winding of the local supply magnet valve devices 16, to permit the valves 146 to be forced from their seats and effect communication from the local reservoir 5 to the brake pipe 9 to increase brake pipe pressure and thus decrease the degree of application of the brakes. This circuit extends from the positive terminal of the battery 200 through contact members 172 and 181 of the retardation controller device 17, through conductor 206, the winding of the magnet 147 and conductor 203 to the negative terminal of the battery 200. Upon movement of the switch member 172 from engagement with the switch contact members 181 and 179 the reverse operation of the control magnet valve devices will occur, the retardation controller 17 thus maintaining the degree of application of the brakes within the desired limits.

If during the operation of the vehicle the winding 191 of the emergency relay 19 becomes deenergized for any reason, such as by release of manual pressure on the deadman switch 21, the operation of the conductors switch 22, or upon interruption in any other manner of the train line circuit comprising these two switches, the emergency relay contact members 192 and 193 will drop to their lower positions. As the contact member 192 drops to its lower position the circuit through the magnet winding of the local supply magnet valve devices 16 is interrupted and the valve 146 is forced to its seat by the spring 148. As the contact member 193 drops to its lower position a circuit is completed from the positive terminal of the battery 200 through conductor 195, contact member 193, to conductor 208. From the conductor 208 the circuits are completed as above traced through the magnet windings of the supply magnet valve device 13 and of the discharge magnet valve device 15 to the negative terminal of the battery 200, thus moving the valve 72 to its seat to prevent the supply of fluid under pressure from the main reservoir 11 to the brake pipe 9, and moving the valve 137 from its seat for effecting the release of fluid under pressure from the brake pipe 9 through the discharge magnet valve device 15, to effect an application of the brakes independently of the operation of the brake valve device 14.

While I have illustrated and described one preferred embodiment of my invention it will be apparent to those skilled in the art that many changes in the illustrated apparatus may be made within the spirit of my invention, and I do not wish to be limited otherwise than by the scope of the appended claims.

Having now described my invention, what I claim as new and desire to secure by Letters Patent, is:

1. In a brake equipment for vehicles, a brake cylinder, means for supplying fluid under pressure to said brake cylinder, a brake pipe, a self-lapping brake valve device for reducing brake pipe pressure any desired amount below a predetermined value in accordance with the amount of movement from its release position to effect a desired degree of application of the brakes, a relay valve device responsive to brake pipe pressure for controlling the supply of fluid under pressure to said brake cylinder, said relay valve device comprising a piston chamber and valve means operative in accordance with the pressure in said piston chamber for controlling the supply of fluid under pressure to said brake cylinder, means comprising a lever arm and valve mechanism actuated thereby for controlling the pressure in said piston chamber, and means responsive to a decrease in brake pipe pressure below a predetermined value for actuating said lever arm to effect the supply of fluid under pressure to said piston chamber in accordance with the reduction in brake pipe pressure below said predetermined value.

2. In a brake equipment for vehicles, a brake cylinder, means for supplying fluid under pressure to said brake cylinder, a brake pipe, and means for reducing brake pipe pressure any desired amount below a predetermined value to effect a desired degree of application of the brakes, a relay valve device responsive to brake pipe pressure for controlling the supply of fluid under pressure to said brake cylinder, said relay valve device comprising a piston chamber and valve means for controlling the supply of fluid under pressure to said brake cylinder for effecting a brake cylinder pressure corresponding to the pressure in said piston chamber, valve means for controlling the supply of fluid under pressure to said piston chamber and valve means for effecting communication between said piston chamber and the atmosphere, valve operating mechanism comprising a rotatable member and biasing means for operating said member in a direction to effect movement of said first named valve means to open communication therethrough and for operating said second named valve means to close communication therethrough, and pressure means responsive to brake pipe pressure for opposing said biasing means to close communication through said first named valve means and to open communication through said second named valve means.

3. In a brake equipment for vehicles, a brake cylinder, means for supplying fluid under pressure to said brake cylinder, a brake pipe, and means for reducing brake pipe pressure any desired amount below a predetermined value to effect a desired degree of application of the brakes, a relay valve device responsive to brake pipe pressure for controlling the supply of fluid under pressure to said brake cylinder, said relay valve device having a piston chamber and valve means for controlling the supply of fluid under pressure to said brake cylinder for effecting a brake cylinder pressure corresponding to the pressure in said piston chamber, valve operating mechanism comprising a rotatively mounted shaft, valve means operatively connected to said shaft for controlling the supply of fluid under pressure to said piston chamber, valve means operatively connected to said shaft for effecting communication between said piston chamber and the atmosphere, biasing means for urging said shaft to a position to cause said first named valve means to open communication therethrough and to cause said second named valve means to close communication therethrough, and pressure responsive means responsive to brake pipe pressure for opposing said biasing means to close communication through said first named valve means and to open communication through said second named valve means, and means responsive to the pressure in said piston chamber for opposing said biasing means to effect the operation of said valve means to maintain the pressure in said piston chamber at a value corresponding to the reduction in brake pipe pressure below said predetermined value.

4. In a brake equipment for vehicles, a brake cylinder, a brake pipe, a manually operable self-lapping brake valve device having a supply valve and a discharge valve therein for controlling the reduction in the brake pipe pressure below a predetermined value in accordance with the degree of movement of the brake valve handle from its release position, a relay valve device responsive to brake pipe pressure for controlling the supply of fluid under pressure to said brake cylinder to effect and maintain a brake cylinder pressure corresponding to said reduction in brake pipe pressure below said predetermined value, said relay valve device having a piston chamber and valve means operated in accordance with the pressure in said piston chamber, for effecting the supply of fluid under pressure to said brake cylinder, means for effecting communication between said piston chamber and the atmosphere when brake pipe pressure is above a predetermined value, means subject to a decrease in brake pipe pressure below said predetermined value for supplying fluid under pressure to said piston chamber in accordance with the reduction in brake pipe pressure below said predetermined value a supply magnet valve device and a discharge magnet valve device for also controlling brake pipe pressure, and means for effecting operation of said supply and discharge magnet valve devices in accordance with the operation of the supply and discharge valves, respectively, of said brake valve device.

5. In a brake equipment for vehicles, a brake cylinder, a brake pipe, a manually operable self-lapping brake valve device having a supply valve and a discharge valve for controlling the supply of fluid under pressure to, and the release of fluid under pressure from, said brake pipe in accordance with the amount of movement of the brake valve handle, a relay valve device responsive to brake pipe pressure for controlling the supply of fluid under pressure to said brake cylinder to effect and maintain a brake cylinder pressure corresponding to the reduction in brake pipe pressure below a predetermined value, a supply magnet valve device and a discharge magnet valve device for controlling the supply of fluid under pressure to, and the release of fluid under pressure from, said brake pipe, means controlled by said brake valve device for effecting operation of said magnet valve devices simultaneously with the operation of the corresponding valves of said brake valve device, and a retardation controller responsive to the rate of retardation of said vehicle for controlling brake pipe pressure to effect a desired rate of retardation of the vehicle.

6. In a brake equipment for vehicles, a brake cylinder, a brake pipe, a manually operable self-lapping brake valve device having a supply valve and a discharge valve for controlling the supply of fluid under pressure to, and the discharge of fluid under pressure from, said brake pipe in accordance with the amount of movement of the brake valve handle, a relay valve device responsive to brake pipe pressure for controlling the supply of fluid under pressure to the brake cylinder to effect and maintain a brake cylinder pressure corresponding to the reduction in brake pipe pressure below a predetermined value, a supply magnet valve device and a discharge magnet valve device for controlling the supply of fluid under pressure to, and the release of fluid under pressure from, said brake pipe, and switch contact means associated with the supply valve and the discharge valve of said brake valve device for controlling the magnet valve devices to effect the supply of fluid under pressure to, and the release of fluid under pressure from, said brake pipe through said magnet valve devices corresponding to like operations of said brake valve device.

7. In a brake equipment for vehicles, a brake cylinder, a brake pipe, a manually operable self-lapping brake valve device having a supply valve and a release valve for controlling the supply of fluid under pressure to, and the release of fluid under pressure from, said brake pipe in accordance with the movement of the brake valve handle, a relay valve device responsive to brake pipe pressure for controlling the supply of fluid under pressure to said brake cylinders to effect and maintain a brake cylinder pressure corresponding to the reduction in brake pipe pressure below a predetermined value, a supply magnet valve device and a discharge magnet valve device for controlling the supply of fluid under pressure to, and the release of fluid under pressure from, said brake pipe, and switch contact means associated with the supply valves and the release valves of said brake valve device for controlling the magnet valve devices to effect the supply of fluid under pressure to, and the release of fluid under pressure from, said brake pipe, through said magnet valve devices corresponding to like operations of said brake valve device, and a retardation controller responsive to the rate of retardation of the vehicle for controlling the operation of said magnet valve devices to so control brake pipe pressure as to effect a desired rate of retardation of the vehicle.

8. In a brake equipment for vehicles, in combination, a brake cylinder, a brake pipe, means responsive to a reduction in brake pipe pressure for supplying fluid under pressure to said brake cylinder, a brake valve device having supply and release valves for controlling said brake pipe pressure, supply magnet valve devices spaced along said brake pipe for also controlling the supply of fluid under pressure to said brake pipe, release magnet valve devices spaced along said brake pipe for also controlling the release of fluid under pressure from said brake pipe, and electrically operated means for controlling said supply and release magnet valve devices including switches controlled, respectively, by the supply valve and the release valve of said brake valve device to effect the simultaneous supply of fluid under pressure to, or the simultaneous release of fluid under pressure from, said brake pipe at a number of different points.

9. In a brake equipment for vehicles, in combination, a brake pipe, a brake valve device for controlling the supply of fluid under pressure to, and the release of fluid under pressure from, said brake pipe, a plurality of braking units comprising a brake cylinder, means responsive to brake pipe pressure for controlling the supply of fluid under pressure to, and the release of fluid under pressure from, said brake cylinder, to control brake cylinder pressure inversely with variations in brake pipe pressure below a predetermined value, magnet valve devices associated with each braking unit for also controlling the supply of fluid under pressure to, and the release of fluid under pressure from, said brake pipe, a train wire extending through the train, means for interrupting the circuit through said train wire, and means normally energized through said train wire and responsive to the interruption of said train wire circuit for controlling the operation of said magnet valve devices independently of the position of said brake valve device to effect a full service application of the brakes.

10. In a brake equipment for vehicles, in combination, a brake pipe, a brake valve device for controlling the supply of fluid under pressure to, and the release of fluid under pressure from, said brake pipe, a plurality of braking units each comprising a brake cylinder, means responsive to brake pipe pressure for controlling the supply of fluid under pressure to said brake cylinder, magnet valve devices associated with each braking unit for also controlling the supply of fluid under pressure to, and the release of fluid under pressure from, said brake pipe, a train wire extending through the train, means for interrupting the circuit through said train wire, and means normally energized through said train wire and operative upon the interruption of said train wire circuit for controlling the operation of said magnet valve devices independently of the position of said brake valve device to effect a full service application of the brakes.

11. In a brake equipment for vehicles, in combination, a brake cylinder, a brake pipe, means responsive to a reduction in brake pipe pressure for supplying fluid under pressure to said brake cylinder, a brake valve device having supply and release valves for controlling brake pipe pressure, supply magnet valve devices spaced along said brake pipe for also controlling the supply of fluid under pressure to said brake pipe, release magnet valve devices for also controlling the release of fluid under pressure from said brake pipe, electrical means comprising control circuits for said magnet valve devices and switches controlled respectively by the supply valve and the release valve of said brake valve device for operating and magnet valve devices to effect the simultaneous supply of fluid under pressure to, and the simultaneous release of fluid under pressure from, said brake pipe at a number of different points, a train wire extending through the train means for interrupting the circuit through said train wire and means normally energized through said train wire and operative upon the interruption of said train wire circuit for controlling the operation of said magnet valve devices independently of said brake valve device to effect a full service application of the brakes.

12. In a brake equipment for vehicles, in combination, a brake cylinder, a brake pipe, means responsive to a reduction in brake pipe pressure for supplying fluid under pressure to said brake cylinder, a brake valve device having supply and release valves for controlling said brake pipe pressure, magnet valve devices associated with each braking unit and controlled by said brake valve device for effecting the simultaneous supply or release of fluid under pressure to and from said brake pipe to control the application and release of the brakes, a train wire extending through the train, means for interrupting the circuit through said train wire, and means normally energized through said train wire and operative upon the interruption of said train wire circuit for controlling the operation of said magnet valve devices, independently of the position of said brake valve device, to effect a full service application of the brakes.

13. In a brake equipment for vehicles, in combination, a brake cylinder, a brake pipe, means responsive to a reduction in brake pipe pressure for supplying fluid under pressure to said brake cylinder, a brake valve device having supply and release valves for controlling brake pipe pressure, magnet valve devices associated with each braking unit and controlled by said brake valve device for effecting the simultaneous supply or release of fluid under pressure from said brake pipe, a supply magnet valve device for controlling the flow of fluid under pressure from a source of supply to said brake valve device, a train wire extending through the train, means for interrupting the circuit through said train wire, means normally energized through said train wire and operated upon the interruption of said train wire circuit for controlling the operation of said several magnet valve devices independently of the position of said brake valve device to effect a full service application of the brakes, and of said supply magnet valve device to cut off the supply of fluid under pressure to said brake valve device.

14. In a brake equipment for vehicles, in combination, a brake cylinder, a brake pipe, means responsive to a reduction in brake pipe pressure for supplying fluid under pressure to said brake cylinder, a brake valve device having supply and release valves for controlling said brake pipe pressure, supply magnet valve devices associated with a plurality of braking units spaced along said brake pipe for also controlling the supply of fluid under pressure to said brake pipe, discharge magnet valve devices associated with said several braking units spaced along said brake pipes for also controlling the release of fluid under pressure from said brake pipe, electric means including switches controlled, respectively, by the supply valve and the release valve of said brake valve device for controlling the operation of said magnet valve devices to effect the simultaneous supply of fluid under pressure to, or the simultaneous release of fluid under pressure from, said brake pipe at a number of different points, a supply magnet valve device for controlling the flow of fluid under pressure from a main reservoir to said brake device, a train wire extending through the train, means for interrupting the circuit through the said train wire, means normally energized through said train wire and operated upon the interruption of said train wire circuit for controlling the operation of said braking unit magnet valve devices independently of the position of said brake valve device to effect a full service application of the brakes, and to effect operation of said supply magnet valve device to cut off the supply of fluid under pressure to said brake valve device.

15. In a brake equipment for vehicles, in combination, a brake pipe, a brake valve device for controlling the supply of fluid under pressure to, and the release of fluid under pressure from, said brake pipe, a plurality of braking units each comprising a brake cylinder and means responsive to brake pipe pressure for controlling the supply of fluid under pressure to said brake cylinder, magnet valve devices associated with each braking unit for also controlling the supply of fluid under pressure to, and the release of fluid under pressure from, said brake pipe, a supply magnet valve device for controlling the flow of fluid under pressure from a main reservoir to said brake valve device, a train wire extending through the train, means for interrupting the circuit through said train wire, and means normally energized through said train wire and operated upon interruption of said train wire circuit for controlling the operation of said magnet valve devices independently of the position of said brake valve device to effect a full service application of the brakes and to effect operation of said supply magnet valve device to cut off the supply of fluid under pressure to said brake valve device.

16. In a brake equipment for vehicles, in combination, a brake cylinder, a brake pipe, means responsive to a reduction in brake pipe pressure for controlling the supply of fluid under pressure to said brake cylinder, a brake valve device having supply and release valves for controlling the said brake pipe pressure, magnet valve devices associated with each braking unit and controlled by said brake valve for effecting the simultaneous supply or release of fluid under pressure from said brake pipe at the brake valve device and at each braking unit, a discharge cut-off magnet valve device for limiting the release of fluid under pressure from said brake pipe through said brake valve device, a retardation controller device responsive to the rate of retardation of the vehicle, circuits controlled by said retardation controller device for governing the brake controlling magnet valve devices for effecting an increase in brake pipe pressure when the rate of retardation of the vehicle exceeds the desired amount and for controlling the discharge cut-off magnet valve device to prevent the further release of fluid under pressure from said brake pipe through said brake valve device.

17. In a brake equipment for vehicles, in combination, a brake cylinder, a brake pipe, means responsive to a reduction in brake pipe pressure for supplying fluid under pressure to said brake cylinder, a brake valve device having supply and discharge valves for controlling said brake pipe pressure, supply magnet valve devices for also controlling the supply of fluid under pressure to said brake pipe, release magnet valve devices for also controlling the release of fluid under pressure from said brake pipe, electrical means comprising switches controlled by said supply valve and said release valve, respectively, of said brake valve device for controlling the simultaneous operation of said several valves to effect the supply of fluid under pressure to, or the release of fluid under pressure from, said brake pipe, a discharge cut-off magnet valve device for limiting the discharge of fluid under pressure from said brake pipe through said brake valve device, a retardation controller responsive to the rate of retardation of the vehicle, and circuits controlled by said retardation controller for governing the brake controlling magnet valve devices for effecting an increase in brake pipe pressure and for controlling the discharge cut-off magnet valve device to prevent the further release of fluid under pressure from said brake pipe through said magnet valve device.

18. In a brake equipment for vehicles, in combination, a brake pipe, a brake valve device for controlling the supply of fluid under pressure to, and the release of fluid under pressure from, said brake pipe, a plurality of braking units each comprising a brake cylinder and means responsive to brake pipe pressure for controlling the supply of fluid under pressure to said brake cylinder, magnet valve devices associated with each braking unit for also controlling the supply of fluid under pressure to, and the release of fluid under pressure from, said brake pipe, a discharge cut-off magnet valve device for limiting the discharge of fluid under pressure from said brake pipe through said brake valve device, a retardation controller device responsive to the rate of retardation of the vehicle, and circuits controlled by said retardation controller device for governing the brake controlling magnet valve devices for effecting an increase in brake pipe pressure and for controlling the discharge cut-off magnet valve device to prevent the further release of fluid under pressure from said brake pipe through said brake valve device.

19. In a brake equipment for vehicles, in combination, a brake pipe, a brake valve device for controlling the supply of fluid under pressure to said brake pipe and for effecting a reduction in brake pipe pressure an amount corresponding to a degree of movement of said brake valve device from its release position, a plurality of braking units each comprising a brake cylinder and a relay valve device for controlling the supply of fluid under pressure to, and the release of fluid under pressure from, the brake cylinder, said relay valve device comprising valve mechanism for controlling brake cylinder pressure, a fulcrumed valve operating mechanism, biasing means effective to operate said relay valve device to full service application position, and two pressure operated devices for opposing said biasing means having pressure responsive elements of equal area, one of said pressure operated devices being responsive to brake pipe pressure, and the other being responsive to brake cylinder pressure.

20. In a brake equipment for vehicles, in combination, a brake pipe, a brake valve device for controlling the supply of fluid under pressure to said brake pipe and for effecting a desired reduction in brake pipe pressure, a plurality of braking units each comprising a brake cylinder and means including a relay valve device for controlling the supply of fluid under pressure to, and the release of fluid under pressure from, said brake cylinder, said relay valve device comprising valve mechanism for controlling brake cylinder pressure, a fulcrumed valve operating mechanism, biasing means effective to urge said valve operating mechanism to service application position, and two pressure operated devices for opposing said biasing means having pressure responsive elements of equal area and having equal radii of application about said fulcrum to cause said mechanism to be responsive to a reduction in the sum of the values of brake pipe pressure and brake cylinder pressure below a predetermined value for effecting the supply of fluid under pressure to said brake cylinder, and responsive to an increase in the sum of the value of brake pipe pressure and brake cylinder pressure above said predetermined value for effecting the release of fluid under pressure from said brake cylinder.

21. In a brake equipment for vehicles, in combination, a brake pipe, means for reducing brake pipe pressure any desired amount below a predetermined value, a brake cylinder, a relay valve device having valve means for controlling the supply of fluid under pressure to and the release of fluid under pressure from said brake cylinder and control means for said valve means comprising a fulcrumed lever, biasing means for biasing said lever to a position to effect the supply of fluid under pressure to said brake cylinder, and a pair of pressure responsive means for actuating said lever against the opposition of said biasing means, one of said pressure responsive means being responsive to brake cylinder pressure and the other being responsive to brake pipe pressure.

22. In a vehicle brake system, in combination, fluid pressure brake means, a brake pipe, means operated upon a reduction in brake pipe pressure for effecting an application of said brake means and operative upon an increase in brake pipe pressure for effecting a release of said brake means, and means operative at a chosen rate of retardation of the vehicle to increase brake pipe pressure to effect a release of said brake means.

23. In a vehicle brake system, in combination, fluid pressure brake means, a brake pipe, means operated upon a reduction in brake pipe pressure for effecting an application of said brake means and operative upon an increase in brake pipe pressure for effecting a release of said brake means, a retardation controller device operated according to the rate of retardation of the vehicle, and electroresponsive means responsive to operation of said retardation controller device at a chosen rate of retardation to increase brake pipe pressure to effect a release of said brake means.

24. In a vehicle brake system, in combination, fluid pressure brake means, a brake pipe, means operated upon a reduction in brake pipe pressure for effecting an application of said brake means, electroresponsive means for effecting an increase in brake pipe pressure to effect a release of said brake means, a brake valve device for manually controlling operation of said electroresponsive means, and a retardation controller device operated according to the rate of retardation of the vehicle for also controlling said electroresponsive means.

JOHN W. LOGAN, Jr.

CERTIFICATE OF CORRECTION.

Patent No. 2,084,693.                         June 22, 1937.

JOHN W. LOGAN, JR.

It is hereby certified that error appears in the printed specification of the above numbered patent requiring correction as follows: Page 8, second column, line 3, after the word "value" insert a comma; Page 9, second column, line 18, claim 11, for "and" read said; line 23, same claim, after "train" insert a comma; and that the said Letters Patent should be read with these corrections therein that the same may conform to the record of the case in the Patent Office.

Signed and sealed this 12th day of October, A. D. 1937.

(Seal)                                                    Henry Van Arsdale.
                                                        Acting Commissioner of Patents.